United States Patent
Baxter et al.

(10) Patent No.: US 10,213,731 B2
(45) Date of Patent: Feb. 26, 2019

(54) METHOD AND APPARATUS FOR CONTINUOUS REMOVAL OF CARBON DIOXIDE VAPORS FROM GASES

(71) Applicants: Larry Baxter, Orem, UT (US); Aaron Sayre, Spanish Fork, UT (US); Stephanie Burt, Provo, UT (US); Nathan Davis, Bountiful, UT (US)

(72) Inventors: Larry Baxter, Orem, UT (US); Aaron Sayre, Spanish Fork, UT (US); Stephanie Burt, Provo, UT (US); Nathan Davis, Bountiful, UT (US)

(73) Assignee: Sustainable Energy Solutions LLC, LLC, Orem, UT (US)

( * ) Notice: Subject to any disclaimer, the term of this patent is extended or adjusted under 35 U.S.C. 154(b) by 8 days.

(21) Appl. No.: 15/410,024

(22) Filed: Jan. 19, 2017

(65) Prior Publication Data

US 2018/0200666 A1 Jul. 19, 2018

(51) Int. Cl.
*F25J 3/06* (2006.01)
*B01D 53/14* (2006.01)
(Continued)

(52) U.S. Cl.
CPC ..... *B01D 53/1475* (2013.01); *B01D 53/1425* (2013.01); *B01D 53/1493* (2013.01);
(Continued)

(58) Field of Classification Search
None
See application file for complete search history.

(56) References Cited

U.S. PATENT DOCUMENTS

| 4,491,566 A * | 1/1985 | Adams | B01D 53/1412 |
| | | | 422/106 |
| 2005/0169825 A1* | 8/2005 | Cadours | B01D 53/1425 |
| | | | 423/220 |

(Continued)

*Primary Examiner* — Daniel Berns (57) ABSTRACT

A method for continuously removing carbon dioxide vapor from a carrier gas is disclosed. This method includes, first, causing direct contact of the carrier gas with a liquid mixture in a separation chamber, the carrier gas condensing at a lower temperature than the carbon dioxide vapor. A combination of chemical effects cause the carbon dioxide to condense, complex, or both condense and complex with the liquid mixture. The liquid mixture is chosen from the group consisting of: first, a combination of components that can be maintained in a liquid phase at a temperature below the carbon dioxide vapor's condensation point, whereby the carbon dioxide condenses into the liquid mixture; second, a combination of components where at least one component forms a chemical complex with the carbon dioxide vapor and thereby extracts at least a portion of the carbon dioxide vapor from the carrier gas; and third, a combination of components that can both be maintained in a liquid phase at a temperature below the carbon dioxide's condensation point, and wherein at least one component forms a chemical complex with the carbon dioxide vapor and thereby extracts at least a portion of the carbon dioxide vapor from the carrier gas. The liquid mixture is then reconstituted after passing through the separation chamber by a chemical separation process chosen to remove an equivalent amount of the carbon dioxide vapor from the liquid mixture as was removed from the carrier gas. The reconstituted liquid mixture is restored to temperature and pressure through heat exchange, compression, and expansion, as necessary, in preparation for recycling back to the separation chamber. The liquid mixture is then returned to the separation chamber. In this manner, the carrier gas leaving the exchanger has (Continued)

between 1% and 100% of the carbon dioxide vapor removed.

15 Claims, 7 Drawing Sheets (51) Int. Cl.
*B01D 53/62* (2006.01)
*B01D 53/78* (2006.01)
*B01D 53/96* (2006.01)
*C10L 3/10* (2006.01)

(52) U.S. Cl.
CPC .............. *B01D 53/62* (2013.01); *B01D 53/96* (2013.01); *C10L 3/104* (2013.01); *F25J 3/067* (2013.01); *B01D 2252/102* (2013.01); *B01D 2252/103* (2013.01); *B01D 2252/2023* (2013.01); *B01D 2252/504* (2013.01); *C10L 2290/541* (2013.01)

(56) References Cited

U.S. PATENT DOCUMENTS

| | | | |
|---|---|---|---|
| 2011/0005389 A1* | 1/2011 | Webley | B01D 53/0476 95/26 |
| 2013/0139543 A1* | 6/2013 | Baxter | F25J 3/067 62/611 |
| 2016/0024975 A1* | 1/2016 | Gurin | F01K 25/103 60/671 |

* cited by examiner

PRIOR ART

FIG. 7

PRIOR ART

METHOD AND APPARATUS FOR CONTINUOUS REMOVAL OF CARBON DIOXIDE VAPORS FROM GASES

This invention was made with government support under DE-FE0028697 awarded by The Department of Energy. The government has certain rights in the invention.

BACKGROUND

Field of the Invention

This invention relates generally to the field of purification of gases. Our immediate interest is in the removal of carbon dioxide vapor from a gas stream, such as natural gas, syngas, and air.

Related Technology

The art of gas purification has been part of industry for many years. This includes the removal of entrained solids and liquids, as well as separation of gases. The process of removing vapors from carrier gas streams is especially of interest to hydrocarbon suppliers, combustion gas producing facilities, purified gas suppliers, and many others. Vapor removal is primarily conducted by either chemical complexing, condensation, or desublimation.

Chemical complexing in solids occurs by passing the gas stream through a bed of desiccants or related solids that chemically bind the vapor. Chemical complexing in liquids occurs in brine solutions, near-eutectic solutions, or other systems where the liquid has the ability to complex with the vapor.

Condensation occurs when the partial pressure of the vapor is reduced below the vapor's condensation point, allowing the vapor to condense into a liquid form. Desublimation is considered a form of condensation, as it brings a gas to a condensed state, namely to a solid.

The greatest difficulty in gas purification is energy costs. Standard techniques are costly, requiring large amounts of energy for distillation, reconstitution of solid desiccants, and similar processes. Further, the solutions used for vapor removal can be highly toxic, difficult to work with, or simply expensive.

As the separation of gases becomes more prevalent in technology, new methods are needed to address any limitations that exist.

United States patent publication number 2008/7314502 to Kelley teaches a method for the separation of a single component from a multi-component gas stream. This disclosure is pertinent and could benefit from vapor removal methods disclosed herein and is hereby incorporated for reference in its entirety for all that it teaches.

United States patent publication number 2011/0203174 to Lackner teaches a method and apparatus for extracting carbon dioxide from air. This disclosure is pertinent and could benefit from vapor removal methods disclosed herein and is hereby incorporated for reference in its entirety for all that it teaches.

U.S. Pat. No. 9,067,173 to Alban teaches a method and equipment for treating carbon dioxide-rich smoke. This disclosure is pertinent and could benefit from vapor removal methods disclosed herein and is hereby incorporated for reference in its entirety for all that it teaches.

U.S. Pat. No. 8,088,197 to Wright teaches a method for removing carbon dioxide from air. This disclosure is pertinent and could benefit from vapor removal methods disclosed herein and is hereby incorporated for reference in its entirety for all that it teaches.

Other current technologies include methods for heat and mass transfer utilizing gas streams. These methods are affected by the limitations discussed above, namely cost and energy requirements.

SUMMARY

A method for continuously removing carbon dioxide vapor from a carrier gas is disclosed. This method includes, first, causing direct contact of the carrier gas with a liquid mixture in a separation chamber, the carrier gas condensing at a lower temperature than the carbon dioxide vapor. A combination of chemical effects cause the carbon dioxide to condense, complex, or both condense and complex with the liquid mixture. The liquid mixture is chosen from the group consisting of: first, a combination of components that can be maintained in a liquid phase at a temperature below the carbon dioxide vapor's condensation point, whereby the carbon dioxide condenses into the liquid mixture; second, a combination of components where at least one component forms a chemical complex with the carbon dioxide vapor and thereby extracts at least a portion of the carbon dioxide vapor from the carrier gas; and third, a combination of components that can both be maintained in a liquid phase at a temperature below the carbon dioxide's condensation point, and wherein at least one component forms a chemical complex with the carbon dioxide vapor and thereby extracts at least a portion of the carbon dioxide vapor from the carrier gas. The liquid mixture is then reconstituted after passing through the separation chamber by a chemical separation process chosen to remove an equivalent amount of the carbon dioxide vapor from the liquid mixture as was removed from the carrier gas. The reconstituted liquid mixture is restored to temperature and pressure through heat exchange, compression, and expansion, as necessary, in preparation for recycling back to the separation chamber. The liquid mixture is then returned to the separation chamber. In this manner, the carrier gas leaving the exchanger has between 1% and 100% of the carbon dioxide vapor removed.

The liquid mixture may consist of a mixture of water and a compound from either of the following two groups: i) ionic compounds including potassium carbonate, potassium formate, potassium acetate, calcium magnesium acetate, magnesium chloride, sodium chloride, lithium chloride, and calcium chloride; and, ii) soluble organic compounds including glycerol, ammonia, propylene glycol, ethylene glycol, ethanol, and methanol. The carrier gas may consist of combustion flue gas, syngas, producer gas, natural gas, steam reforming gas, any hydrocarbon that has higher volatility than carbon dioxide, or light gases.

The separation chamber may be either a counter-current, direct-contact exchanger or a co-current, direct-contact exchanger.

The chemical separation process for reconstituting the liquid mixture may be distillation, pressure-swing separation, liquid extraction, solid extraction, reverse osmosis, forward osmosis, filtration, stripping, or a combination of these.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
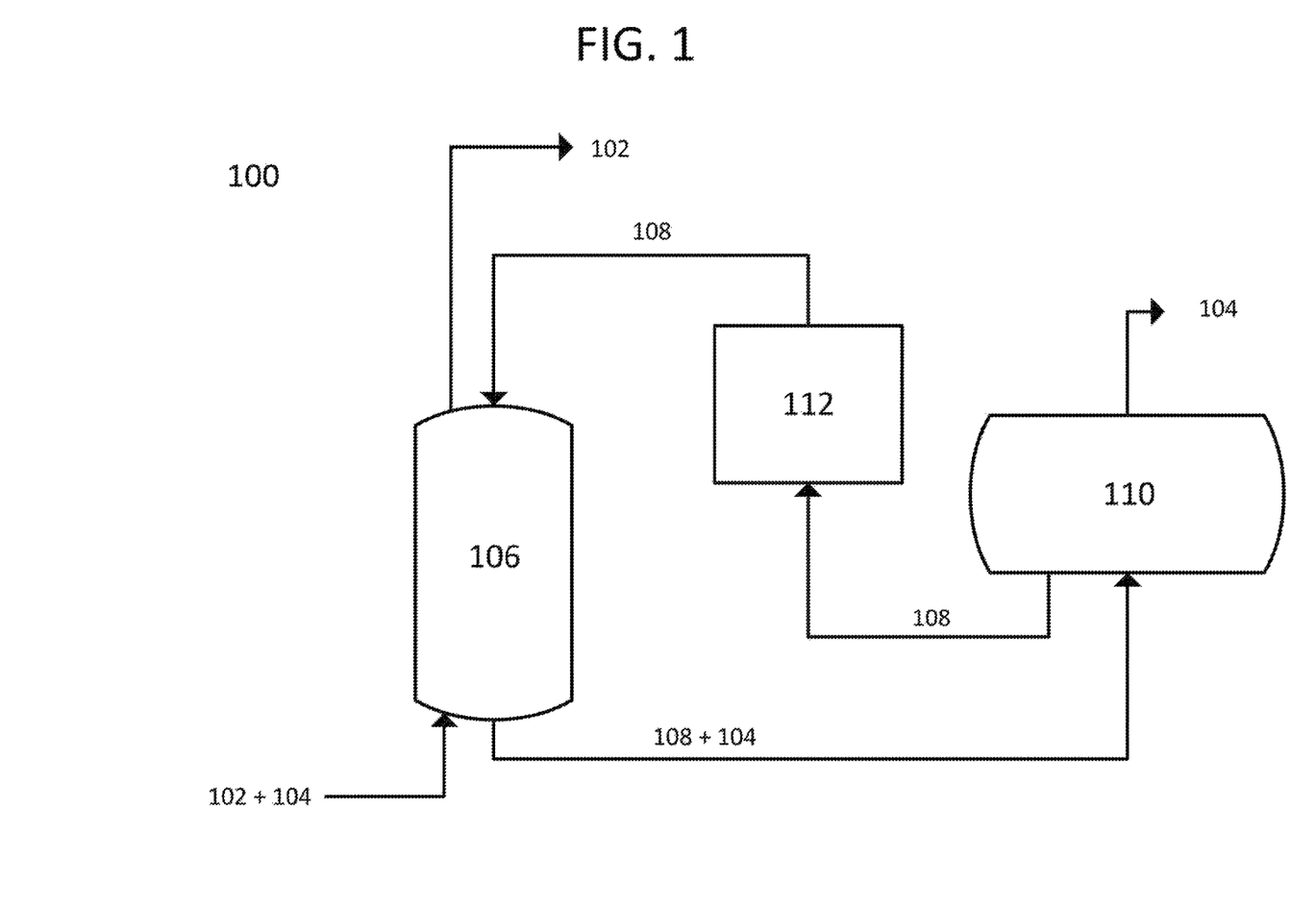
FIG. 1 shows a general process flow diagram in accordance with an embodiment of the invention.

Referring to FIG. 1, a process flow diagram 100 is shown. A carrier gas 102, containing a carbon dioxide vapor 104 to be removed, enters a separation chamber 106. A cold liquid mixture 108 enters separation chamber 106 flowing counter-current to the carrier gas 102/carbon dioxide vapor 104 combination. Carrier gas 102 exits separations chamber 106 with substantially less carbon dioxide vapor 104. In some embodiments, this can mean a removal of between 1% and 100% of carbon dioxide vapor 104. Liquid mixture 108 and extracted carbon dioxide vapor 104 exit separations chamber 106 and are conveyed to a separations system 110. Extracted carbon dioxide vapor is transported as a combination of carbon dioxide dissolved in liquid mixture 108, carbon dioxide complexed in liquid mixture 108, and solid carbon dioxide suspended in liquid mixture 108. Captured carbon dioxide vapor 104 is removed in separations system 110, and liquid mixture 108, now at the same composition as required for separation chamber 106, is sent to a heat exchanger, compressor, or expander 112 to bring liquid mixture 108 to the required temperature for separations chamber 106.

The chemical separation process for reconstituting the liquid mixture may be distillation, pressure-swing separation, liquid extraction, solid extraction, reverse osmosis, forward osmosis, filtration, stripping, or a combination of these.

In some embodiments, the liquid mixture consists of water and a compound from either of the following two groups: i) ionic compounds including potassium carbonate, potassium formate, potassium acetate, calcium magnesium acetate, magnesium chloride, sodium chloride, lithium chloride, and calcium chloride; and, ii) soluble organic compounds including glycerol, ammonia, propylene glycol, ethylene glycol, ethanol, and methanol. Carrier gas 102 may be combustion flue gas, syngas, producer gas, natural gas, steam reforming gas, any hydrocarbon that has higher volatility than carbon dioxide, or light gases.

Combustion flue gas consists of the exhaust gas from a fireplace, oven, furnace, boiler, steam generator, or other combustor. The combustion fuel sources include coal, hydrocarbons, and biomass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than carbon dioxide, including hydrogen, helium, nitrogen, and oxygen. This list is for example only and should not be implied to constitute a limitation as to the viability of other gases in the process. A person of skill in the art would be able to evaluate any gas as to whether it has higher volatility than carbon dioxide.

In some embodiments of the present invention, liquid mixture 108 is conveyed from separation chamber 106 by a pump. While an appropriate pump can be chosen by one of normal skill in the art, the pump chosen would preferentially be a cryogenic-style pump, capable of handling temperatures below the freezing point of carbon dioxide, as well as handling solid particles. The pump chosen could be a centrifugal, piston, pressure-recovery, propeller, circulator, slurry, positive-displacement, diaphragm, progressive-cavity, screw, or vane pump. The internals of the pump would again be chosen based on the specifics of liquid mixture 108, but would have to be chosen to be resistant to whatever materials were conveyed. They would need to be cold resistant, but may also need to be acid or corrosive resistant. The possibility of particulates, especially in cases where the carrier gas may have contaminants like soot or dust, would also indicate an erosion resistant material, such as ceramic or stainless steel.

Figure 2:
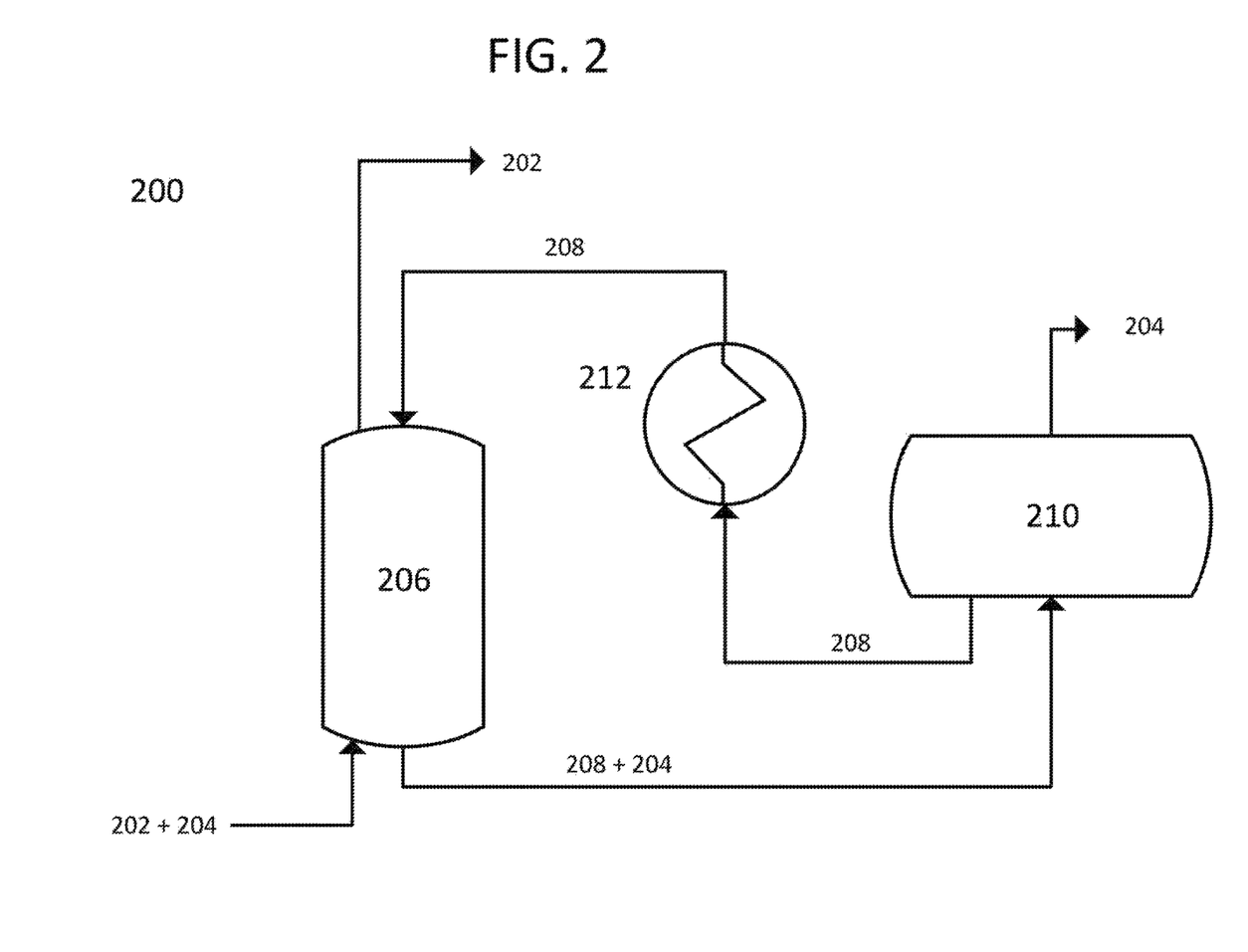
FIG. 2 shows a process flow diagram for dehydrating combustion flue gas, in accordance with an embodiment of the invention.

Referring to FIG. 2, one embodiment of the present invention is disclosed, with a process flow diagram 200 shown. In this embodiment, a combustion flue gas 202, containing carbon dioxide vapor 204 to be removed, enters a counter-current direct contact exchanger 206. A cold liquid mixture 208 enters exchanger 206 flowing counter-current to the combustion flue gas 202/carbon dioxide vapor 204 combination. Liquid mixture 208 is chosen to consist of water and calcium chloride at an appropriate concentration and temperature, as per FIG. 6. Combustion flue gas 202 exits exchanger 206 with all carbon dioxide vapor 204 removed. Liquid mixture 208 and extracted carbon dioxide 204 exit exchanger 206 and are conveyed to a solid-liquid separation system 210 where the captured solid carbon dioxide 204 is removed, and liquid mixture 208, now at the same composition as required for exchanger 206, is sent to a heat exchanger 212 for cooling to the required temperature for exchanger 206. Liquid mixture 208 is assumed to reach an equilibrium with dissolved and complexed carbon dioxide as it recirculates, meaning the removed carbon dioxide is primarily removed as a solid.

Figure 3:
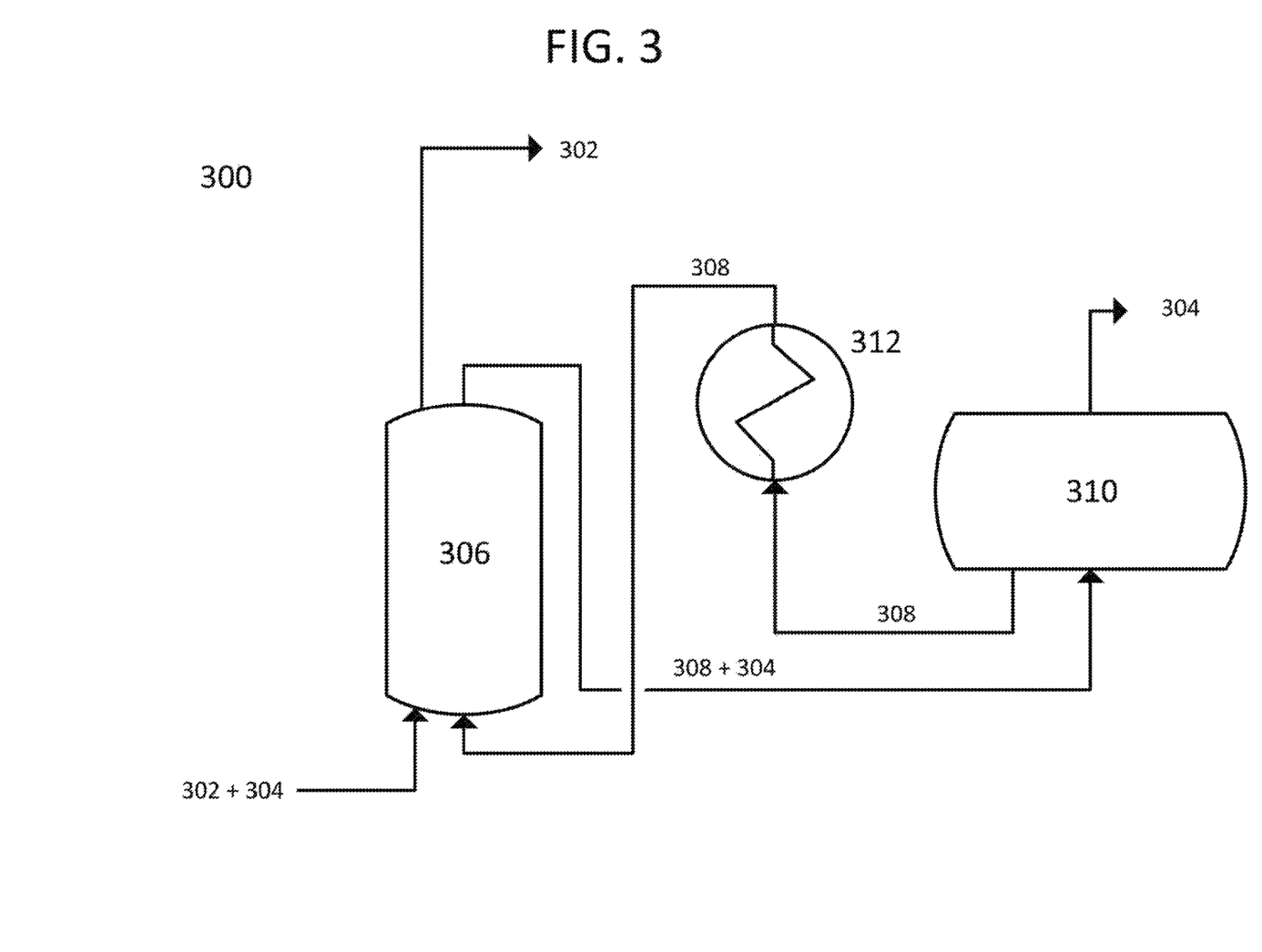
FIG. 3 shows a process flow diagram for dehydrating natural gas, in accordance with an embodiment of the invention.

Referring to FIG. 3, another embodiment of the present invention is disclosed, with a process flow diagram 300 shown. In this embodiment, natural gas 302, containing a carbon dioxide vapor 304 to be removed, enters a co-current direct contact exchanger 306. A cold liquid mixture 308 enters exchanger 306 flowing co-current to the liquefied natural gas 302/carbon dioxide vapor 304 combination. Liquid mixture 308 is chosen to to consist of water and ethanol at an appropriate concentration and temperature, as per FIG. 7. Liquefied natural gas 302 exits exchanger 306 with all carbon dioxide vapor 304 removed. Liquid mixture 308 and extracted carbon dioxide 304 exit exchanger 306 and are conveyed to a solid-liquid separation system 310 where the captured solid carbon dioxide 304 is removed, and liquid mixture 308, now at the same composition as required for exchanger 306, is sent to a heat exchanger 312 for cooling to the required temperature for exchanger 306. Liquid mixture 308 is assumed to reach an equilibrium with dissolved and complexed carbon dioxide as it recirculates, meaning the removed carbon dioxide is primarily removed as a solid.

Figure 4:
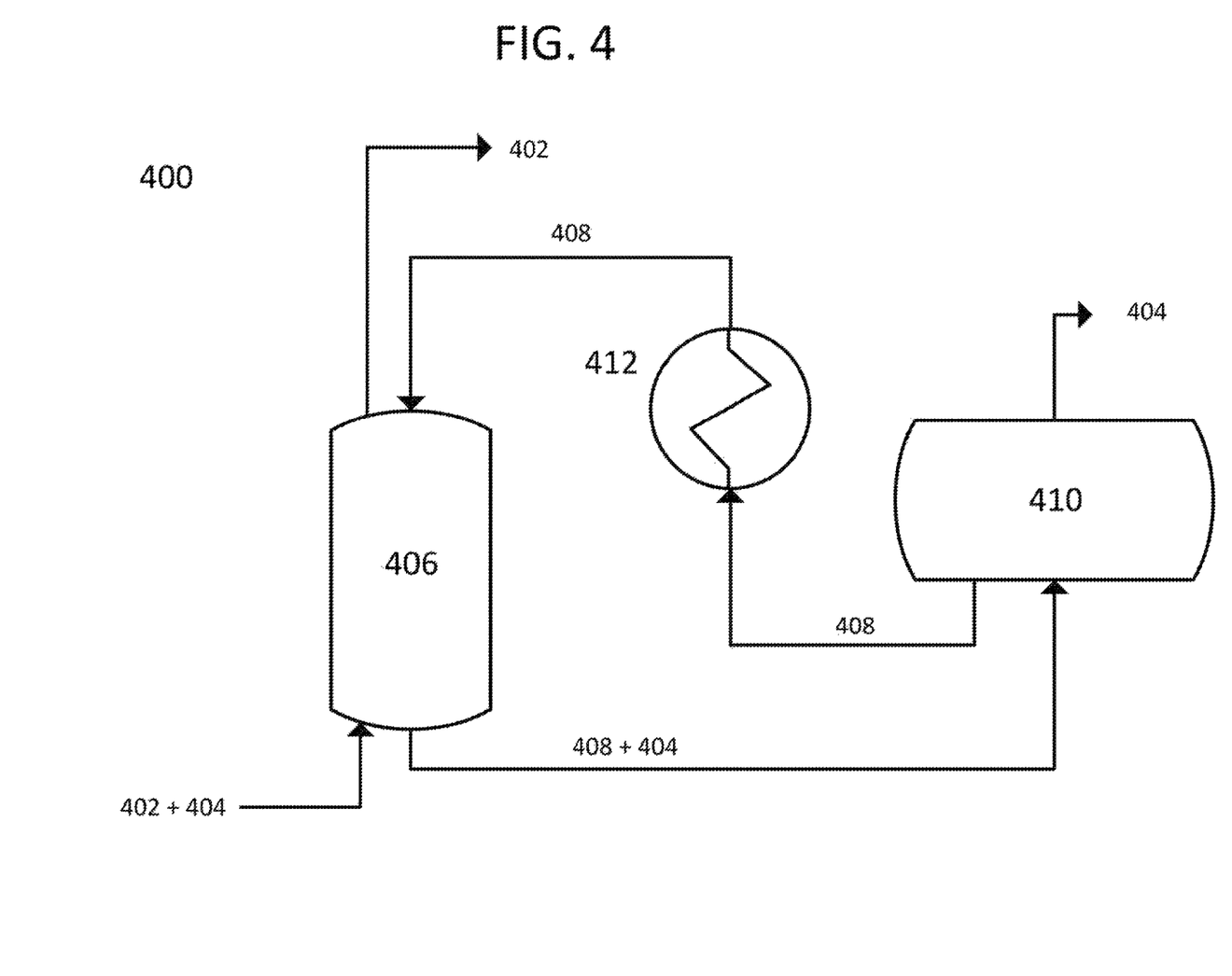
FIG. 4 shows a process flow diagram for dehydrating propane gas, in accordance with an embodiment of the invention.

Referring to FIG. 4, one embodiment of the present invention is disclosed, with a process flow diagram 400 shown. In this embodiment, propane gas 402, containing carbon dioxide vapor 404 to be removed, enters a counter-current direct contact exchanger 406. A cold liquid mixture 408 enters exchanger 406 flowing counter-current to the propane 402/carbon dioxide vapor 404 combination. Liquid mixture 408 is chosen to consist of water and potassium acetate at an appropriate concentration and temperature, as per FIG. 6. Propane gas 402 exits exchanger 406 with all carbon dioxide vapor 404 removed. Liquid mixture 408 and extracted carbon dioxide 404 exit exchanger 406 and are conveyed to a solid-liquid separation system 410 where the captured solid carbon dioxide 404 is removed, and liquid mixture 408, now at the same composition as required for exchanger 406, is sent to a heat exchanger 412 for cooling to the required temperature for exchanger 406. Liquid mixture 408 is assumed to reach an equilibrium with dissolved and complexed carbon dioxide as it recirculates, meaning the removed carbon dioxide is primarily removed as a solid.

Figure 5:
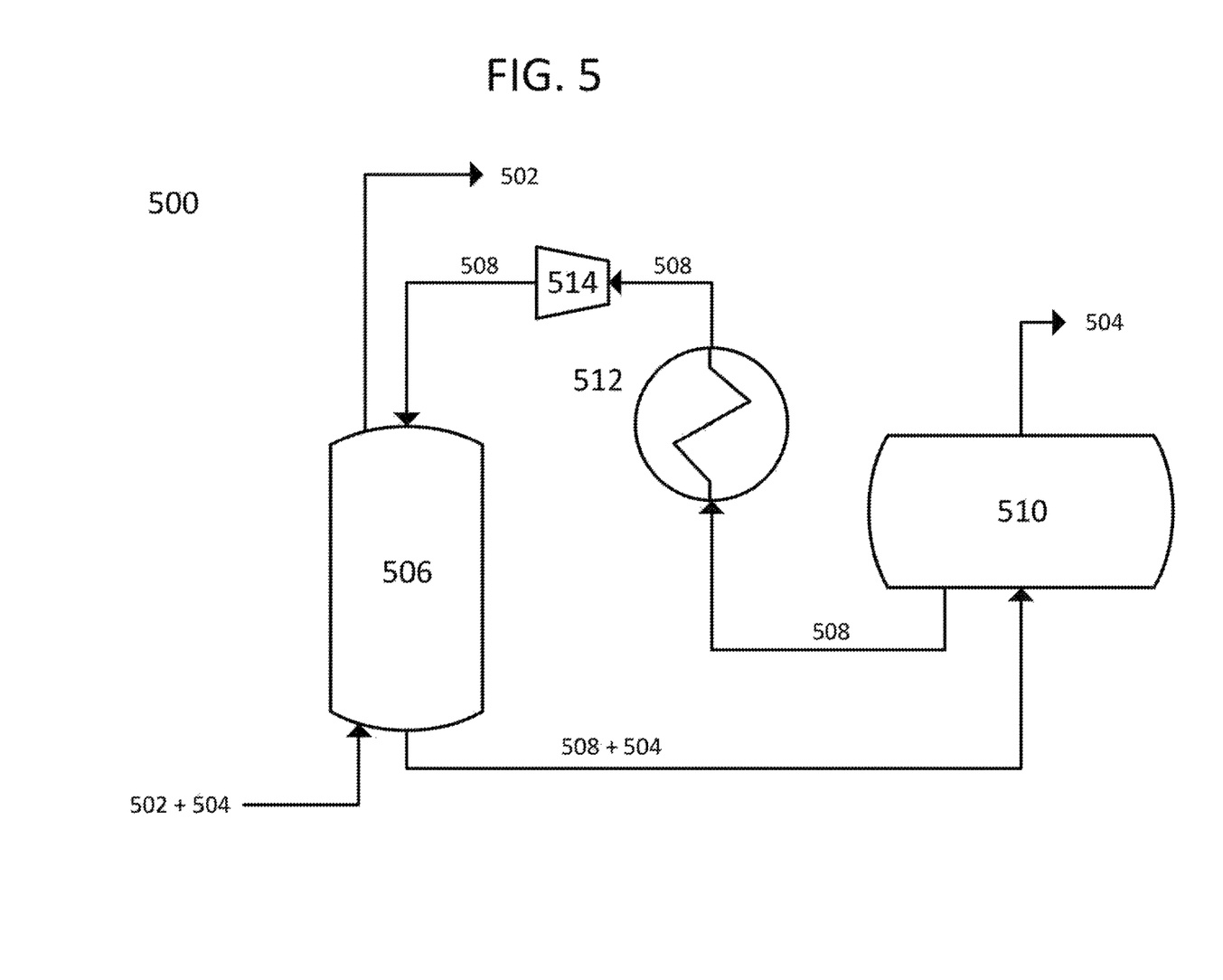
FIG. 5 shows a process flow diagram for dehydrating nitrogen gas, in accordance with an embodiment of the invention.

Referring to FIG. 5, one embodiment of the present invention is disclosed, with a process flow diagram 500 shown. In this embodiment, nitrogen gas 502, containing carbon dioxide vapor 504 to be removed, enters a counter-current direct contact exchanger 506. A cold liquid mixture 508 enters exchanger 506 flowing counter-current to the nitrogen gas 502/carbon dioxide vapor 504 combination. Liquid mixture 508 is chosen to consist of water and potassium acetate at an appropriate concentration and temperature, as per FIG. 7. Nitrogen gas 502 exits exchanger 506 with all carbon dioxide vapor 504 removed. Liquid mixture 508 and extracted carbon dioxide vapor 504 exit exchanger 506 and are conveyed to a flash separation system 510 where the captured solid carbon dioxide 504 is sublimated and removed, and liquid mixture 508, now at the same composition as required for exchanger 506, is sent to a heat exchanger 512 for cooling to the required temperature for exchanger 506. Liquid mixture 508 is assumed to reach an equilibrium with dissolved and complexed carbon dioxide as it recirculates, meaning the removed carbon dioxide is primarily removed as a solid.

Figure 6:
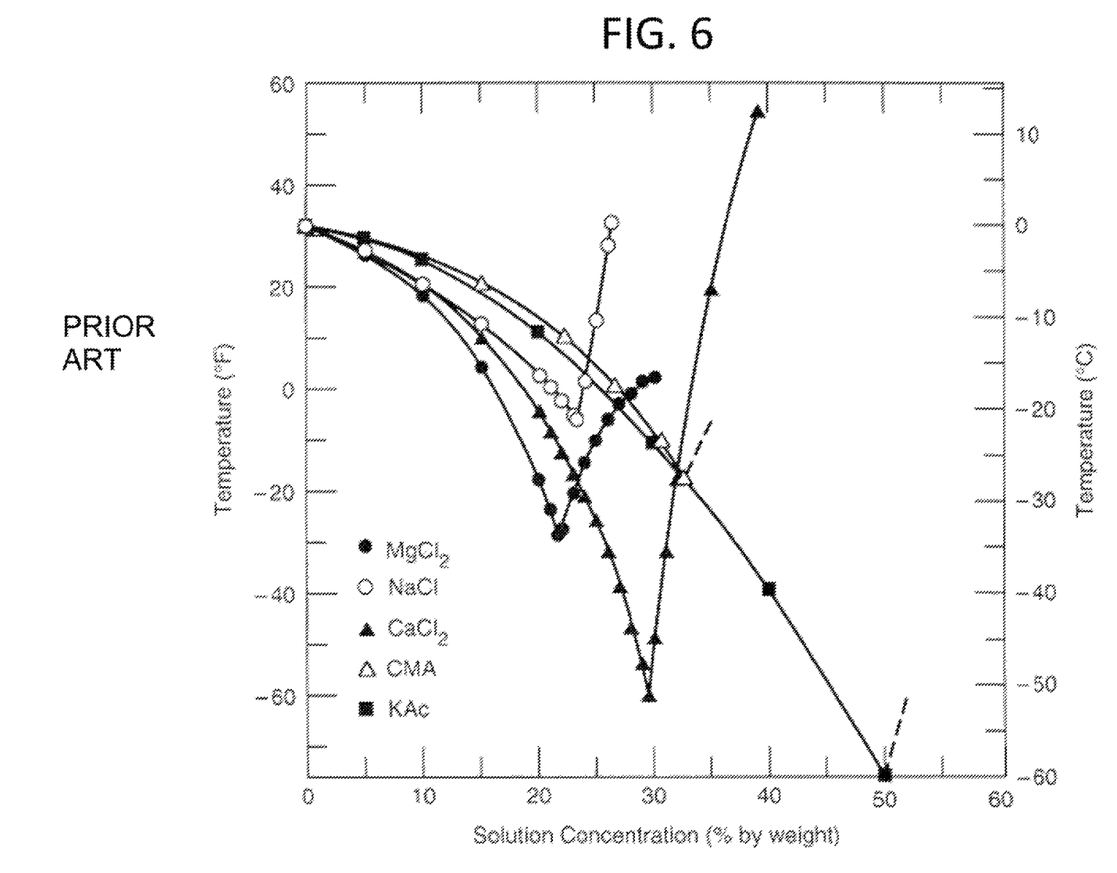
FIG. 6 shows a phase diagram for ionic compounds that include a subset of useful compounds in accordance with some embodiments of the invention.

Referring to FIG. 6, a phase diagram for various ionic compounds that are acceptable for use as part of liquid mixture 108, 208, or 408 with water is shown. While this list includes very useful ionic compounds in solution with water, this chart should not be interpreted as limiting the selection of compounds useful in the present invention. Those of ordinary skill in the art can determine the desired concentration and temperatures for liquid mixtures 108, 208, and 408 based on reference charts and phase diagrams for different combinations of compounds. In the case of the phase diagram in FIG. 6, the concentration chosen will determine the temperature that liquid mixture 108, 208, or 408 can reach. Depending on how much carbon dioxide vapor is to be removed, different concentrations will be required. Therefore, liquid mixtures 108, 208, or 408 are chosen to have a combination of one or more of the following properties: (i) Liquid mixture 108, 208, or 408 are at a temperature and pressure such that the partial vapor pressure is below the condensation point of carbon dioxide vapor 104, 204, or 404, and thus carbon dioxide vapor 104, 204, or 404 desublimates. (ii) Liquid mixtures 108, 208, or 408 contain at least one compound that can form complexes with carbon dioxide vapor 104, 204, or 404, the system being at such a concentration that any of carbon dioxide vapor 104, 204, or 404 passing through will be complexed. iii) Liquid mixtures 108, 208, or 408 contain a combination of components wherein at least one component absorbs carbon dioxide vapor 108, 208, or 408 and thereby extracts at least a portion of carbon dioxide vapor 108, 208, or 408 from carrier gas 102, 202, or 402. iv) A combination of the above.

Figure 7:
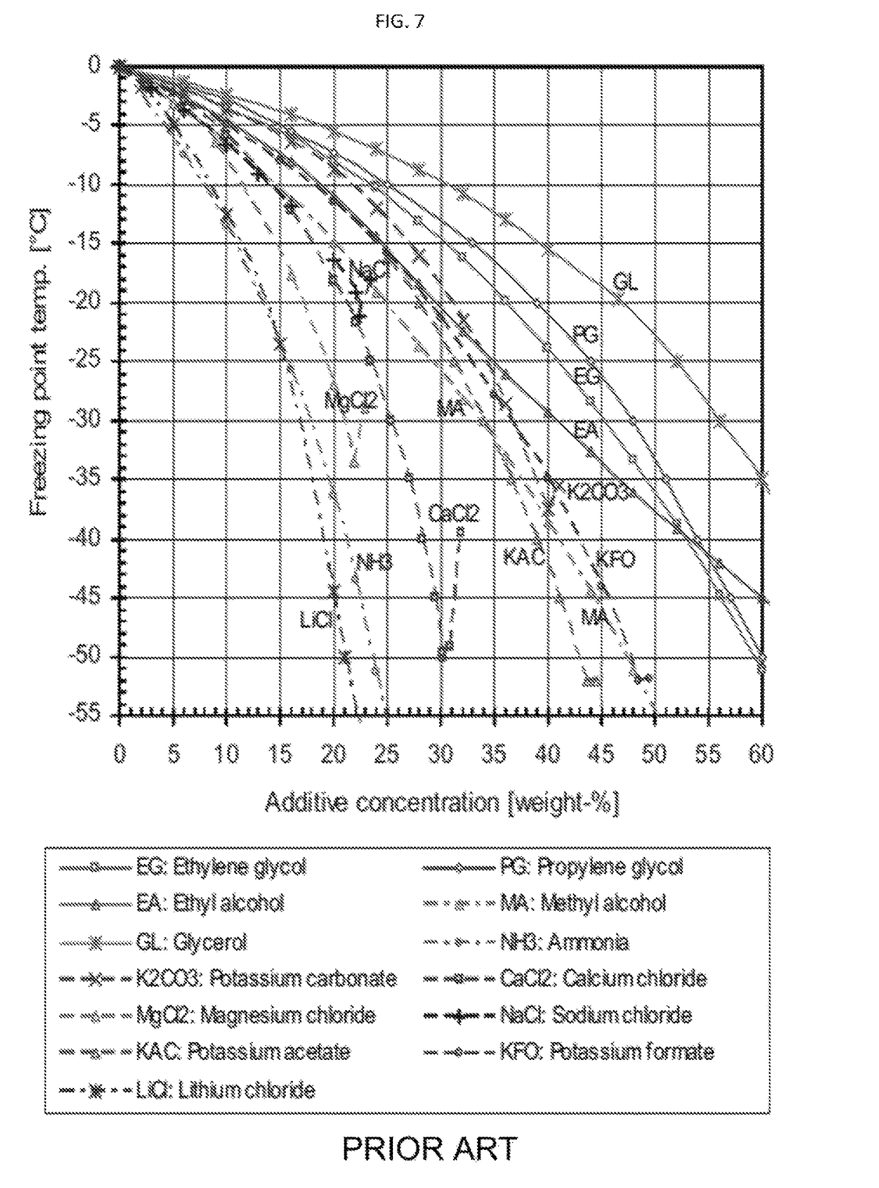
FIG. 7 shows a phase diagram for inorganic and organic compounds that include a subset of useful compounds in accordance with some embodiments of the invention.

Referring to FIG. 7, a phase diagram for various inorganic and organic compounds that are acceptable for use as part of liquid mixture 108, 208, 308, 408, and 508 with water is shown. This diagram is prior art. While this list includes very useful organic compounds in solution with water, this chart should not be interpreted as limiting the selection of compounds useful in the present invention. Those of ordinary skill in the art can determine the desired concentration and temperatures for liquid mixtures 108, 208, 308, 408, and 508 based on reference charts and phase diagrams for different combinations of compounds. In the case of the phase diagram in FIG. 7, the concentration chosen will determine the temperature that liquid mixture 108, 208, 308, 408, and 508 can reach. Depending on how much carbon dioxide vapor is to be removed, different concentrations will be required. Therefore, liquid mixture 108, 208, 308, 408, and 508 are chosen to have a combination of one or more of the following properties: (i) Liquid mixture 108, 208, 308, 408, and 508 are at a temperature and pressure such that the partial vapor pressure is below the condensation point of carbon dioxide vapor 104, 204, 304, 404, or 504, and thus carbon dioxide vapor 104, 204, 304, 404, or 504 desublimates. (ii) Liquid mixtures 108, 208, 308, 408, and 508 contain at least one compound that can form complexes with carbon dioxide vapor 104, 204, 304, 404, or 504, the system being at such a concentration that any of carbon dioxide vapor 104, 204, 304, 404, or 504 passing through will be complexed. iii) Liquid mixtures 108, 208, 308, 408, and 508 contain a combination of components wherein at least one component absorbs carbon dioxide vapor 108, 208, 308, 408, and 508 and thereby extracts at least a portion of carbon dioxide vapor 108, 208, 308, 408, and 508 from carrier gas 102, 202, 302, 402, or 502. iv) A combination of the above.

The invention claimed is:

1. A method for removing a carbon dioxide vapor from a carrier gas comprising:
    cooling the carrier gas by direct contact with a liquid mixture causing a portion of the carbon dioxide vapor to desublimate as a solid product into the liquid mixture, resulting in warming of the liquid mixture;
    separating the solid product and the liquid mixture;
    cooling the liquid mixture; and
    recycling the liquid mixture to cool the carrier gas.

2. The method of claim 1, wherein the carrier gas is selected from the group consisting of combustion flue gas, syngas, producer gas, natural gas, steam reforming gas, any hydrocarbon that has a higher volatility than carbon dioxide, and light gases, wherein light gases comprise hydrogen, helium, nitrogen, oxygen, or a combination thereof.

3. The method of claim 1, wherein the liquid mixture comprises a combination of components that are in a liquid phase at a temperature below the carbon dioxide vapor's condensation point.

4. The method of claim 3, wherein the liquid mixture comprises a mixture of water and a compound from the group consisting of potassium carbonate, potassium formate, potassium acetate, calcium magnesium acetate, magnesium chloride, sodium chloride, lithium chloride, calcium chloride, and combinations thereof.

5. The method of claim 3, wherein the liquid mixture comprises a mixture of water and a compound from the group consisting of glycerol, ammonia, propylene glycol, ethylene glycol, ethanol, methanol, and combinations thereof.

6. The method of claim 1, wherein the liquid mixture comprises a combination of components that form a chemical complex with the carbon dioxide vapor.

7. The method of claim 6, wherein direct contact of the carrier gas with the liquid mixture causes the liquid mixture to complex, absorb, or both complex and absorb a portion of the carbon dioxide vapor into the liquid mixture as a complexed carbon dioxide product.

8. The method of claim 7, wherein recycling the liquid mixture further comprises removal of the complexed carbon dioxide product by a separation process selected from a group consisting of distillation, pressure-swing separation, liquid extraction, reverse osmosis, forward osmosis, filtration, stripping, or combinations thereof.

9. The method of claim 1, wherein direct contact of the carrier gas with the liquid mixture occurs in a separation chamber and a cryogenic pump passes the solid product and liquid mixture out of the separation chamber, wherein the cryogenic pump is capable of handling temperatures below a freezing point of carbon dioxide, as well as handling solid particles and is chosen from the group consisting of centrifugal, piston, pressure-recovery, propeller, circulator, slurry, positive-displacement, diaphragm, progressive-cavity, screw, and vane pumps.

10. The method of claim 9, wherein the separation chamber is a counter-current, direct-contact exchanger.

11. The method of claim 9, wherein the separation chamber is a co-current, direct-contact exchanger.

12. The method of claim 9, wherein the cryogenic pump has internal components made of materials resistant to acidic solutions.

13. The method of claim 12, wherein the internal components comprise ceramics, stainless steel, or a combination thereof.

14. The method of claim 9, wherein the cryogenic pump has internal components made of materials resistant to corrosive solutions.

15. The method of claim 14, wherein the internal components comprise ceramics, stainless steel, or a combination thereof.

* * * * *